Nov. 5, 1974  R. E. CROCKER  3,846,302
APPARATUS FOR HEAT TREATING LIQUID OR SEMI-LIQUID MATERIAL
Filed Aug. 2, 1972  3 Sheets-Sheet 3

United States Patent Office 3,846,302
Patented Nov. 5, 1974

3,846,302
APPARATUS FOR HEAT TREATING LIQUID OR SEMI-LIQUID MATERIAL
Roy E. Crocker, Kailua, Hawaii
Filed Aug. 2, 1972, Ser. No. 277,279
Int. Cl. B01d 35/18
U.S. Cl. 210—71
14 Claims

ABSTRACT OF THE DISCLOSURE

An apparatus for heat treating liquid or semi-liquid material having an exchanger portion and a reactor portion. The exchanger portion having concentric space apart cylinders which are secured to a shaft which is rotatably mounted on a base. A continuous triangular-shaped passageway is provided in the space between the cylinders, one end of the passageway being connected via a bore through the center of the shaft, to the source of the liquid to be treated, the other end of the passageway being connected, via a bore through the center of the shaft, to a tube for discharging the liquid. The reactor portion surrounds at least a portion of said cylinder for heating the liquid in a passageway. The passageway is so constructed that the liquid entering the reactor portion is preheated by liquid already heated in the reactor portion.

DESCRIPTION OF THE PRIOR ART

There is an ever-increasing need in sewage treatment plants for an efficient and economical means for sterilizing waste products in the form of sludge. Present methods of rendering this sludge sterile and, thus, suitable for land fill require large and complex devices which represent a considerable capital investment to purchase and are very expensive to operate and maintain.

The sludge, which is the residue remaining after normal treatment of waste products, is fed to present day sterilizing devices under extremely high pressures and processed in the devices at these high pressures and at very high temperatures for long periods of time. This necessitates the use of high pressure pumps and high pressure seals and other means to contain the sludge within the sterilizing device as well as the rest of the system. Further, large heat generating reactors are required in present day sterilizing devices in order to obtain heat at the desired high temperature, thus, resulting in correspondingly high fuel costs.

The present invention eliminates the previously described disadvantages of present day sludge treating devices by providing a system which utilizes a novel reactor-exchanger which can be constructed in almost any size to meet any process flow of sludge desired. The reactor-exchanger of the present invention can treat process fluids at high temperatures and pressures for any pre-selected time and flow rate without the use of high pressure seals and pumping devices or complex check values and traps to contain the fluid within the treating device. The efficiency of reactor-exchanger of the present invention is very high due to a novel arrangement and design of fluid carrying passageways within the exchanger which results in high heat transfer between the already heated fluid and the fluid entering the exchanger.

SUMMARY OF THE INVENTION

The system of the present invention has as its primary function the treatment of 1 to 2 percent sanitary sludge mixtures to produce a sterile product which can readily be dewatered and used safely for land fill or soil conditioning. The system of the present invention can also be used in any process that requires subjecting a product to an elevated temperature and pressure for relatively short periods of time.

The raw material or sludge to be processed is fed under low pressure to the distribution tube of a rotatable heat exchanger having associated with it a reactor for supplying heat to the exchanger at high temperatures. The intake of the heat exchanger is connected to a first triangular-shaped helically wound passageway which extends from the front of the heat exchanger to the rear thereof where it is heated in a zone by the high temperature reactor. At the end of the first passageway, the direction of travel of the heated sludge is reversed and is caused to travel back to the front of the heat exchanger by means of a second triangular-shaped helically wound passageway similar to and adjacent to the first such passageway. As the heated sludge in the second passageway travels to the front of the heat exchanger, it preheats the sludge traveling to the reactor zone. The rotational velocity of the heat exchanger produces centrifugal forces which effectively increase the density of the sludge and also create a high hydrostatic pressure at the mean diameter of the heat exchanger. As the sludge travels to the outlet of the heat exchanger, the pressure at the outlet is essentially the same as it is at the inlet, namely, atmospheric. As a result of the balanced or equal pressures at the inlet and outlet of the heat exchanger, only a slight positive head pressure on the sludge at the intake is necessary to cause the sludge to flow through the passageways.

The efficiency or effectiveness of any reactor-exchanger is a function of the quantity of heat capable of being transferred from the reactor to a medium or from one medium to another medium in the exchanger. This relationship is more commonly called the "heat transfer factor." As is known, the heat transfer factor can be increased substantially by increasing the motion or turbulence of the medium in the exchanger. This turbulence is normally caused by convection currents within the medium. Heretofore this convection causing turbulence has been increased by means of mechanical stirrers in the medium.

The applicant has discovered that these turbulence causing convection currents and thus the heat transfer factor can be greatly increased by rotating the medium at very high speeds which results in a many hundred-fold increase in the gravitational forces acting on the medium in the exchanger as compared to conventional stationary heat exchangers.

The efficiency of the reactor-exchanger of the present invention is further increased by means of the injection of air or other fluid at the inlet where the raw material to be treated enters the heat exchanger. If the raw material is capable of oxidizing to a certain degree, as sludge is, the introduction of air (oxygen) will cause oxidization to occur in the passageways. The heat generated by this oxidization will greatly reduce or eliminate entirely the heat required in the reactor.

Other and further features and advantages of the present invention will become apparent to those skilled in the art from a consideration of the following specification when read in conjunction with the annexed drawings.

DESCRIPTION OF THE INVENTION

Figure 1:
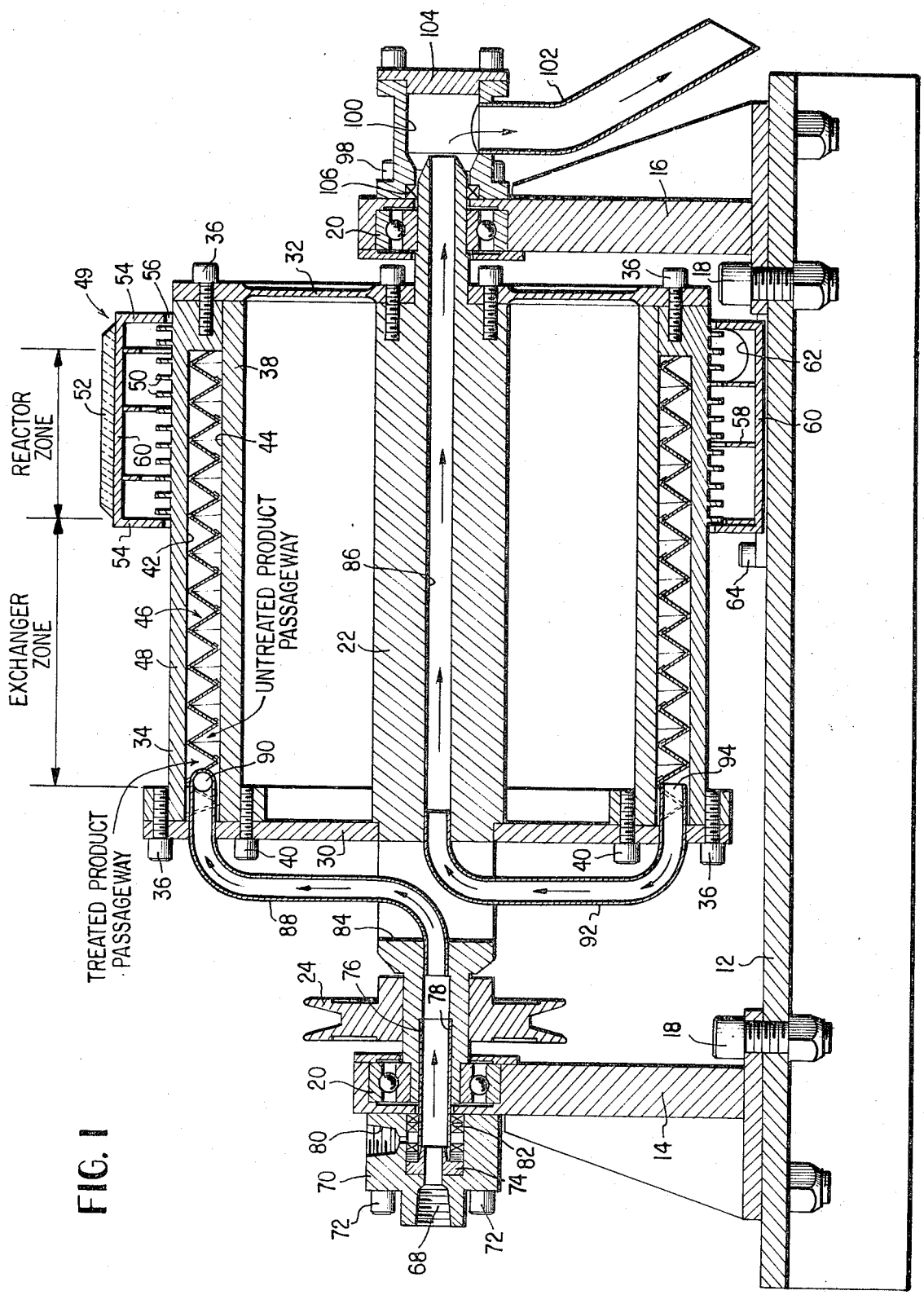
FIG. 1 is a sectional elevation of the reactor-exchanger taken along line I—I in FIG. 2.
Figure 2:
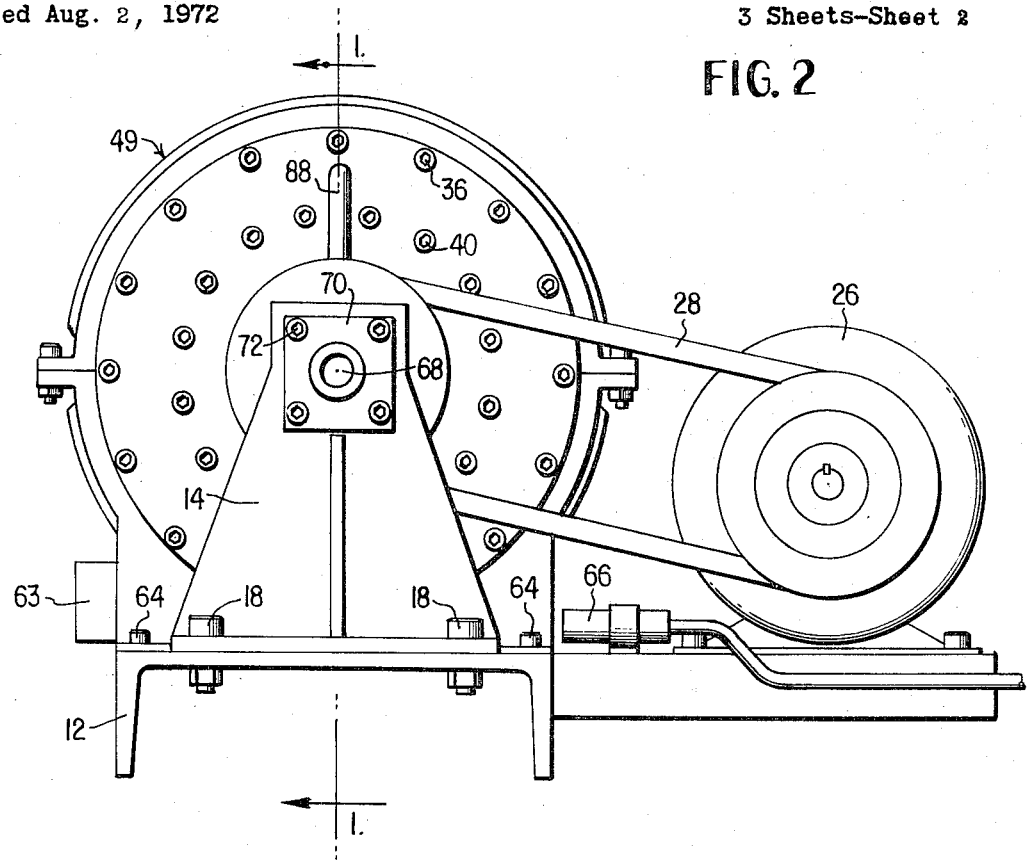
FIG. 2 is an end view of the reactor-exchanger.
Figure 3:
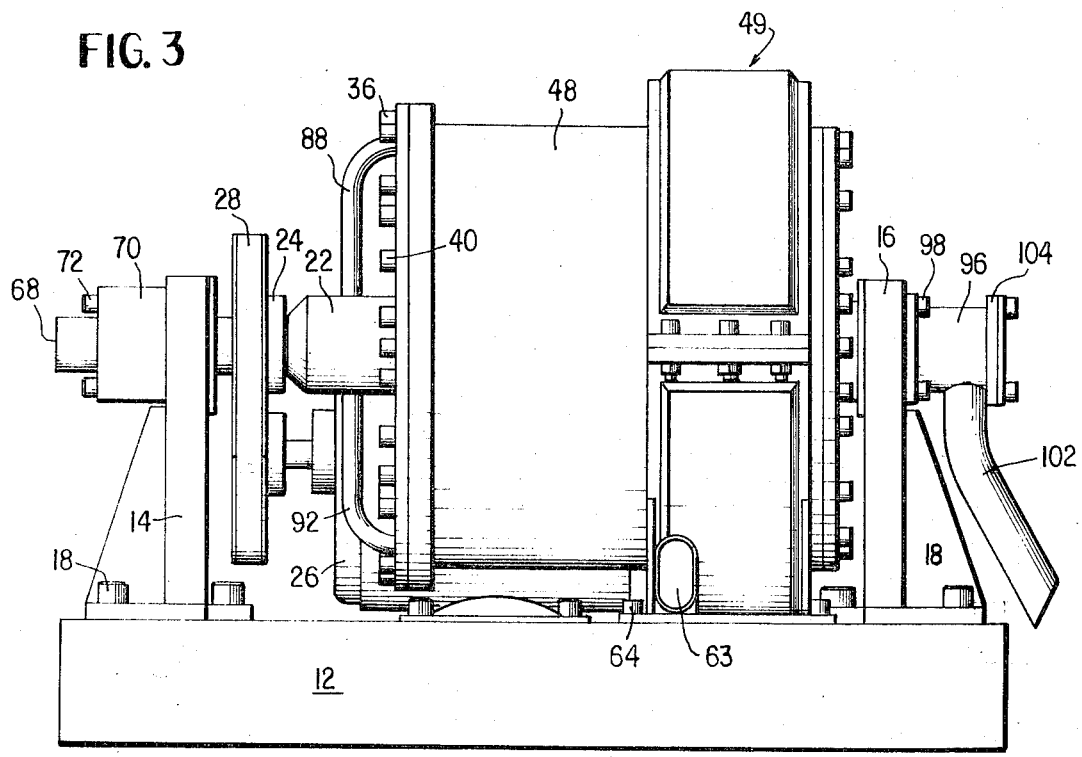
FIG. 3 is a side view of the reactor-exchanger.

Referring in detail to FIGS. 1 through 3, reference numeral 10 generally indicates the reactor-exchanger of the present invention having a base 12. Vertically upstanding bearing brackets 14 and 16 are secured to the base 12 in spaced-apart relationship by means of bracket bolts 18. Bearing brackets 14 and 16 have ball bearings 20 for rotatably supporting a shaft 22 positioned therebetween.

The shaft 22 has a drive pully 24 mounted on one end thereof which is connected to a drive motor 26 by means of a belt 28. The shaft 22 also has mounted thereon radially extending spaced-apart end plates 30, 32. An outer cylindrical-shaped housing member 34 is positioned between the end plates 30, 32 and secured thereto by means of bolts 36. An inner cylindrical-shaped support member 38 is positioned between the end plates 30, 32 and secured thereto by means of bolts 40. A space is provided between the inner surface 42 of the housing member 34 and the outer surface 44 of the support member 38. A helically wound coil indicated generally by numeral 46 is positioned within said space. The coil 46 will be described in greater detail later in conjunction with FIGS. 4, 5 and 6.

A reactor indicated generally by reference numeral 49 is provided for supplying heat to a portion of the coil 46. The reactor 49 comprises a plurality of rings 50 which are integrally formed with the housing member 34. The rings 50 are spaced apart an equal distance from each other around the periphery of the housing member 34. The rings 50 act to keep the heated air circulating within a cover member 52 and also help conduct heat to the housing member 34. The cover member 52 is essentially V-shaped in cross-section and has depending side members 54 which enclose the rings 50 and are spaced a distance 56 from the housing member 34 to permit the housing member 34 and rings 50 to freely rotate within the cover member 52. The cover member 52 has a radially extending spiral-shaped partition 58 which is integrally formed with cross-member 60 of cover member 52. The spiral-shaped partition 58 acts to direct the hot gases entering opening 62 across the housing 34 and rings 50 enclosed by the side members 54. The cover member 52 extends completely around housing member 34 and is secured to the base 12 by means of bolts 64. Heat is supplied to the reactor 49 through an opening 62 by means of a suitable gas or oil heat source 66. An opening 63 is provided in cross-member 60 to permit exhaust of the gases from the heat source 66.

The sludge or other material to be processed is fed by pumping means (not shown) to a first inlet opening 68 in first collar bracket 70 secured to bearing bracket 14 by means of bolts 72. The inlet opening 68 communicates with a nozzle 74 which nozzle directs the sludge into a cylindrical tube 76. The cylindrical tube 76 slightly overlaps the end of nozzle 74 and extends into a first concentric cylindrical-shaped bore 78 in the shaft 22. A second inlet opening 80 in first collar bracket 70 extends to an open area adjacent nozzle 74 to enable air or other suitable catalytic fluid to be introduced into the stream of sludge leaving nozzle 74 and entering cylindrical tube 76. Rubber washers 82 or the like are positioned around cylindrical tube 76 to prevent sludge or air or both from leaking out between the collar bracket 70 and the bearing bracket 14.

The shaft 22 has a rectangular-shaped recess 84 therethrough which communicates with the first concentric cylindrical-shaped bore 78 and a second concentric cylindrical-shaped bore 86. The centerline of bores 78 and 86 is also the centerline of shaft 22. An inlet pipe 88 connects the first cylindrical bore 78 with the inlet 90 of the helically-shaped coil 46. The second cylindrical-shaped bore 86 is connected by means of outlet pipe 92 to the outlet 94 of the helically-shaped coil 46.

A second collar bracket 96 is secured to bearing bracket 16 by means of bolts 98. The second collar bracket 96 has a recess 100 which communicates with both the second cylindrical-shaped bore 86 and a discharge pipe 102 through which the processed material is removed from the exchanger. The second collar bracket 96 has an end cap 104 for closing the recess 100. A washer 106 of suitable material is provided to prevent the material being processed from leaking out between the bearing bracket 16 and the second collar bracket 96.

Figure 4:
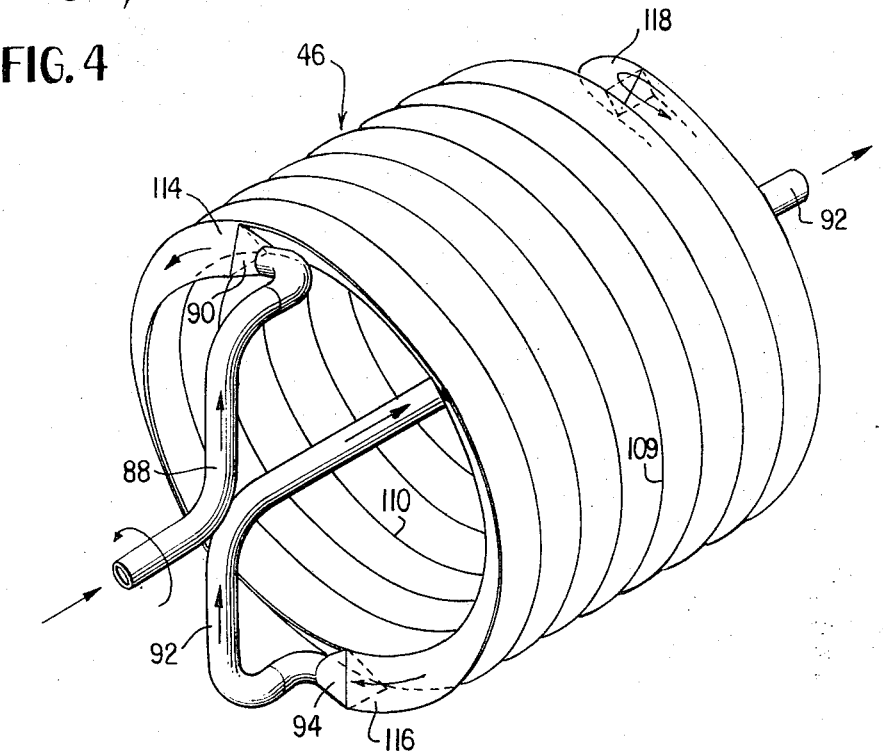
FIG. 4 is a perspective view of the triangular-shaped helically wound passageway.
Figure 5:
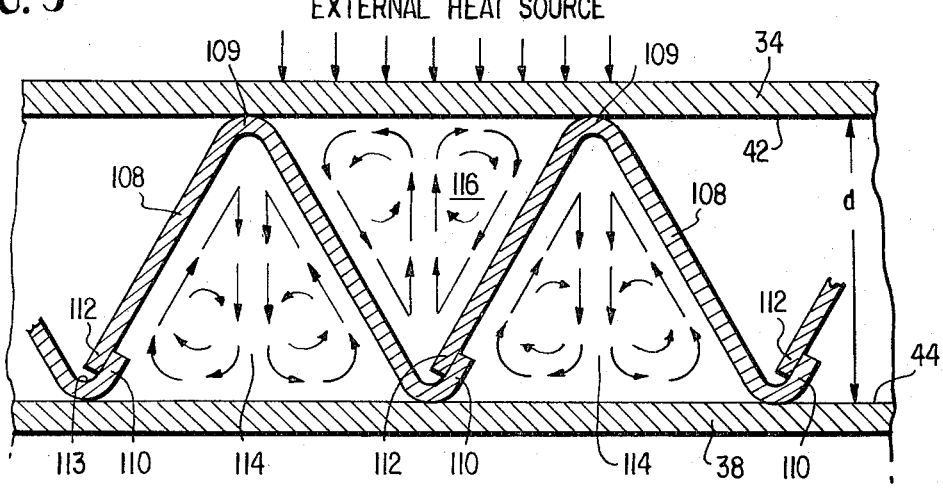
FIG. 5 is an enlarged cross-sectional view of the helically wound passageway shown in FIG. 2.
Figure 6:
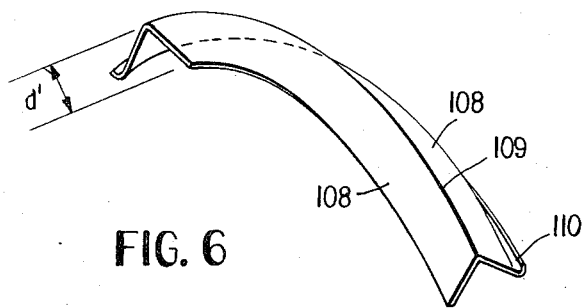
FIG. 6 is a perspective view of a portion of one of the V-shaped elements forming the passageways.

Referring now to FIGS. 4, 5 and 6, the helically wound coil 46 is formed by winding a V-shaped strip of metal 108 such as stainless steel or the like having an apex or bent portion 109. One side of the metal V-shaped strip 108 has a slight upturned portion 110 and an apex or bent portion 111. The other side of the metal V-shaped strip 108 has an edge 112 which is straight. When assembled, the straight edge portion 112 is positioned in the trough 113 created by the upturned portion 110 as shown in FIG. 5. The assembled coil 46, as shown in FIG. 4, has an outer surface which resembles the threads on a conventional bolt and the inner surface thereof resembling the threads on a convetional nut.

When coil 46 is inserted between the inner surface 42 of housing member 34 and the outer surface 44 of support member 38, triangular-shaped inner passageways 114 and outer passageways 116 are formed such that the apex 109 of the inner passageway 114 points in the direction away from the center of rotation of shaft 22 and the apex 111 of the outer passageway 116 points toward the center of rotation of shaft 22. The inlet 90 and outlet 94 are transition elements made of metal which enable the circular inlet pipe 88 and the circular outlet pipe 92 to be connected to the triangular-shaped outer passageway 116 and triangular-shaped inner passageway 114, respectively, of the coil 46.

In order to connect the end of the outer passageway 116 with the beginning of the inner passageway 114, a cap 118 is provided having two triangular-shaped openings which are connected to the beginning and end of the aforementioned passageways.

The distance (d) shown in FIG. 5 between the inner surface 42 of housing member 34 and the outer surface 44 of support member 38 is less than the distance (d') shown in FIG. 6 of the V-shaped strip 108 before its insertion between inner surface 42 and outer surface 44. Upon insertion of the coil 44 between the inner surface 42 and outer surface 44, the straight edge portion 112 and the upturned portion 110 are forced away from each other such that the apex 109 is in resilient engagement with the trough 113 formed by the upturned portion 110 to both aid in providing a mechanical seal against leakage of the material being processed from the inner passageways 114 to the outer passageways 116 as well as providing a mechanical seal between adjacent inner and outer passageways at the point where the apex 109 engages the inner surface 42 and the apex 109 is in resilient engagement with the trough more complete sealing is necessary or desirable between passageways 114 and 116, the seam where the upturned portion 110 and the straight edge portion 112 meet can be welded.

OPERATION

The operation of the reactor-exchanger of the present invention will now be described in detail. The sludge or other raw material to be processed is fed to the first inlet opening 68 at low pressure where it may be mixed with air or other oxidizing fluid which is introduced into the second inlet opening. 80. The sludge then enters inlet 90 via tube 76 and inlet pipe 88. The exchanger is then rotated by means of motor 26 and heat is introduced to the reactor 49 from the heat source 66. The sludge travels through the reactor zone in the inner passageway 114 and its direction is reversed in the end cap 118 and caused to travel back through the reactor zone in the outer passageway 116. The reactor zone is described generally as that portion of inner passageway 114 and outer passageway 116 located between side members 54 of reactor 49. The heat, which the sludge in the outer passageway 116 absorbs from the reactor, is transferred to the sludge entering the reactor zone through inner passageway 114. As the sludge in the outer passageway 116 continues its travel to the outlet 94, its heat is continually absorbed by the incoming sludge in inner passageway 114 and thereby it is preheated on its way to and through the reactor zone. The convection currents which act to mix the sludge moving in passageways 114 and 116 are indicated by the arrows shown in FIG. 4. These convection currents are the result of gravitational forces acting on the sludge in the passageways 114, 116.

The hotter sludge in passageway 116, being of lower density, moves toward the center of rotation of the shaft 22, while the cooler sludge in passageway 114, being of higher density, moves in a direction away from the center of rotation of shaft 22. The aforementioned movement of the sludge greatly increases the efficiency of the section of the exchanger where the incoming sludge is preheated due to the fact that the hottest portion of the heated sludge is adjacent the coolest portion of the incoming sludge.

As stated previously, the heat transfer factor (F) is greatly increased by the gravitational forces generated by rotating the mediums in the exchanger at high speeds which results in greater turbulence within each medium. The amount of heat transferred in B.t.u.'s/hr. (HT) in the heat exchanger can be simply expressed by the equation: $HT = A \times T \times F \times K$, where A is the total surface area through which heat is being transferred, T is the temperature difference between the heat applied by the reactor and the temperature of the medium to be heated, K is a dimensionless coefficient, and F is the heat transfer factor. The heat transfer factor F is dependent on the conductivity of the membrane or wall through which heat is being transferred, the absorption qualities of medium involved and the amount of motion or turbulence causing the heated and cooled medium to move away from the heating or cooling surfaces of the membrane or wall. In the reactor-exchanger of the present invention, the membrane or wall comprises the outer cylindrical wall 34, the inner cylindrical wall 38 and the helical-shaped coil 46.

The amount of turbulence is proportional to the amount of the gravitational forces acting on the medium. In a stationary heat exchanger, these gravitational forces would be only the force of gravity or 32 ft./sec.$^2$ whereas in the present heat exchanger, by rotating the exchanger portion and thus the medium, gravitational forces from three hundred to five hundred times the force of gravity are obtained resulting in a corresponding proportional increase in the turbulence in the medium or sludge.

As can be seen, by greatly increasing the heat transfer factor (F) in this manner, great reductions can be achieved in the surface area A and the amount of heat required to be supplied from the heat source, thus enabling the reactor-exchanger to be considerably smaller in size and lower in cost when compared to conventional reactor-exchangers processing the same amount of material to the same degree of heat treatment.

The hot or treated sludge then moves through outlet pipe 92, through the second cylindrical-shaped bore 86 in the shaft 22, and into recess 100 where it is drawn off through discharge pipe 102.

The following table describes the physical characteristics of a typical reactor-exchanger of the present invention capable of treating sludge being introduced at the rate of 100 gallons per minute without any air to aid oxidation. It is understood that this table is merely an example given for illustrative purposes and is not to be construed as limiting the scope of the invention in any way. The reactor-exchanger of the present invention can, in fact, be made to almost any size to handle almost any flow rate of material to be treated:

| | |
|---|---|
| Reactor chamber mean diameter | 36 inches |
| Reactor tube length total | 76 feet (8 coils of 9.5 feet) |
| Exchanger tube length (incoming raw) | 76 feet (8 coils of 9.5 feet) |
| Exchanger tube length (outgoing treated) | 76 feet (8 coils of 9.5 feet) |
| Exchanger cross-section area | 4.5 sq. inches |
| Rotational speed | 1,000 f.p.m. |
| Reactor pressure (maximum) | 500 p.s.i. |
| Reactor temperature (maximum) | 500 degrees F. |
| Flow rate | 100 g.p.m. (7.0 f.p.s.) |
| B.t.u./hr. from heat source (no heat of oxidation) | 50 degrees F. |
| Horsepower | 25 |
| Weight | 400 lbs. empty or 1,000 lbs. operating |

The reactor pressure is controlled by the rotational velocity of the exchanger which can be automatically varied as required by the process; for example, by sensing load changes. The flow rate can be manually set by regulating the pumping device supplying the sludge to first inlet 68. The flow rate can also be controlled automatically by a conventional controller (now shown) which senses the temperature difference between the incoming and outgoing sludge. The controller would then regulate the pump speed and at the same time regulate the fuel flow to the heat source 66.

If the material to be treated has a low viscosity, no external pressure from a pump would be required to force the material through the reactor-exchanger, it would, in fact, pump itself. As can be seen, the hydrostatic head pressure $P_1$ created by the cooler high density liquid in inlet pipe 88 can be represented by the equation $P_1 = KW^2R^2D_1$ where W equals the rotational speed of the exchanger, R equals the radius of the inlet pipe 88, $D_1$ equals the density of 70° F. raw sludge and K being a constant. This can be compared to the hydrostatic pressure $P_2$ of the treated sludge in the outlet pipe 92 represented by the equation $P_2 = KW^2R^2D_2$ where W, R, and K are the same as in the equation for $P_1$ but where $D_2$ is the density of hot sludge at 100° F.

From the foregoing equations, it can be seen that there will be a flow of sludge from the inlet pipe 88 towards the outlet pipe 92 if the pressure created in the inlet pipe 88 is greater than the pressure in the outlet pipe 92, and this flow of sludge will be proportional to the square root of this difference in pressures.

When the reactor-exchanger is operating in the aforementioned manner, it is in effect self-regulating. Thus, if the temperature of the sludge at the outlet pipe 92 rises, resulting in an increase in the flow of the sludge through the reactor zone, such an increase in the flow will decrease the heat transfer time between the raw sludge and the treated sludge. Such a decrease in the transfer time will decrease the temperature of the sludge at the outlet pipe 92, thus, returning the system to a balanced condition. Conversely, if the temperature at the outlet pipe 92 is reduced, the transfer time will increase to again raise the temperaturme at the outlet pipe 92.

If the material to be treated contains some matter that readily oxidizes, the introduction of air at the second inlet 80 will facilitate oxidation of the mixture in the reactor zone. The heat resulting from this oxidization is then used to heat the raw material traveling from the inlet 90 to the reactor zone, thus, reducing or eliminating the heat required from heat source 66.

In the optimum situation, once the oxidization has started, and the pressures, flow and temperature have been stabilized, the process will be self-sustaining except for the minimal power required by motor 26 to spin the reactor-exchanger.

Having illustrated and described an embodiment of this invention in some detail, it will be understood that this description and illustration have been offered by way of example, and that the invention is to be limited in scope only by the appended claims.

What I claim is:

1. An apparatus for heat treating raw material comprising:
   (a) a support,
   (b) shaft means rotatably mounted on said support,
   (c) spaced-apart concentric cylinder means mounted on said shaft means,
   (d) reactor means for supplying heat to said cylinder means,
   (e) coil means located between said cylinder means, said coil means having an inlet means for introducing said raw material to said coil means and an outlet means for removing treated material from said coil means, said coil means being so constructed that said treated material preheats said raw material before said treated material is removed at said outlet means, and
   (f) means for rotating said cylinder means and said coil means to create a centrifugal force on said raw material and said treated material.

2. Apparatus according to claim 1 wherein said coil means comprises a helically wound V-shaped member having an apex and two-side portions.

3. Apparatus according to claim 2 wherein said coil means forms triangular-shaped passageways when located between said cylinder means, said passageways acting to transfer said material from said inlet means to said outlet means.

4. Apparatus according to claim 3 wherein said inlet means is connected to said passageway having the apex of said V-shaped member directed away from a centerline through said shaft means.

5. Apparatus according to claim 2 wherein one of said side portions has an upturned edge portion and the other of said side portions has a flat-edge portion, said flat-edge portion being located within said upturned edge portion when said V-shaped member is helically wound.

6. Apparatus according to claim 1 wherein said shaft means has a concentric bore through a first portion thereof and a concentric bore through a second portion thereof, and means connecting said inlet means to one end of said bore through said first portion and means connecting said outlet means to one end of said bore through said second portion.

7. Apparatus according to claim 6 further comprising first fluid-tight collar means communicating with the other end of said bore through said first portion, said first collar means having inlet recess means for introducing said raw material into said bore, and a second fluid-tight collar means in communication with the other end of said bore through said second portion, said collar means having an outlet recess means for removing said treated material from said bore in said second portion.

8. Apparatus according to claim 7 wherein said first collar means has additional recess means for introducing an additional fluid into said raw material entering said inlet recess.

9. Apparatus according to claim 1 wherein said reactor means further comprises housing means surrounding at least a portion of said cylinder means, said housing means having an opening for introducing heat from a source.

10. Apparatus according to claim 9 wherein said portion of said cylinder means surrounded by said housing means has a plurality of radially extending ring means for conducting heat from said source to said cylinder means and wherein said housing means has additional means for channeling heat from said source to said ring means.

11. A method of heat treating fluid material comprising the steps of:
    (a) providing a coil means having an inlet means for introducing said material to be treated and an outlet means for removing treated material from said coil means,
    (b) applying heat to said coil means from a source, said coil means being so constructed that said treated material preheats said material to be treated before said material is removed at said outlet means, and
    (c) rotating said coil means to create a centrifugal force on said material.

12. The method as set forth in claim 11 wherein said force is several hundred times the force of gravity.

13. The method as set forth in claim 11 further comprising the steps of adding an additional fluid at said inlet means to the material to be treated.

14. The method as set forth in claim 11 wherein said coil means comprises a helically wound V-shaped member having an apex and two-side portions forming a continuous passageway, said inlet means being connected to a portion of said passageway having said apex directed toward said source of heat.

References Cited
UNITED STATES PATENTS

| | | | |
|---|---|---|---|
| 3,187,809 | 6/1965 | Spears | 165—90 |
| 2,091,119 | 8/1937 | Saint-Jacques | 165—156 |
| 3,706,383 | 12/1972 | Palma | 210—512 |
| 3,369,663 | 2/1968 | Serrell | 210—78 |

CHARLES N. HART, Primary Examiner

F. F. CALVETTI, Assistant Examiner

U.S. Cl. X.R.

210—179, 512; 165—90, 156